United States Patent
Karl et al.

(10) Patent No.: US 9,911,207 B2
(45) Date of Patent: Mar. 6, 2018

(54) COHERENT DIFFRACTIVE IMAGING WITH SPACED-APART BEAMS

(71) Applicant: Regents of the University of Colorado, a body corporate, Denver, CO (US)

(72) Inventors: Robert M. Karl, Boulder, CO (US); Daniel E. Adams, Thornton, CO (US); Charles S. Bevis, Boulder, CO (US); Henry C. Kapteyn, Boulder, CO (US); Margaret M. Murnane, Boulder, CO (US)

(73) Assignee: KM Labs, Inc., Boulder, CO (US)

( * ) Notice: Subject to any disclaimer, the term of this patent is extended or adjusted under 35 U.S.C. 154(b) by 17 days.

(21) Appl. No.: 15/256,726

(22) Filed: Sep. 5, 2016

(65) Prior Publication Data

US 2017/0069116 A1   Mar. 9, 2017

Related U.S. Application Data

(60) Provisional application No. 62/214,138, filed on Sep. 3, 2015.

(51) Int. Cl.
*G06T 11/00* (2006.01)
*G02B 27/42* (2006.01)
*G02B 27/58* (2006.01)

(52) U.S. Cl.
CPC ........ *G06T 11/005* (2013.01); *G02B 27/4205* (2013.01); *G02B 27/58* (2013.01)

(58) Field of Classification Search
CPC .. G06T 11/003; G06T 11/005; G02B 27/4205
USPC ................................. 250/550; 356/450, 521
See application file for complete search history.

(56) References Cited

U.S. PATENT DOCUMENTS

2017/0178317 A1* 6/2017 Besley ............... G02B 21/0004

\* cited by examiner

*Primary Examiner* — Kevin Pyo
(74) *Attorney, Agent, or Firm* — Macheledt Bales LLP; Jennifer L. Bales (57) ABSTRACT

Apparatus and methods for Coherent Diffractive Imaging with multiple, simultaneous, spatially distinct beams chosen and configured to isolate incoherent sums of beam diffraction such that interference between the multiple beams is not present in the data prior to computationally reconstructing the image. This is accomplished through selecting the multiple beams to be non-interfering modes, or through designing the apparatus such that the interference is not recorded, or through processing the collected data to filter the interference before reconstructing the image.

20 Claims, 8 Drawing Sheets

COHERENT DIFFRACTIVE IMAGING WITH SPACED-APART BEAMS

This invention was made with government support under contract number DARPA-12-63-PULSE-FP-004. The government has certain rights in this invention.

BACKGROUND OF THE INVENTION

Field of the Invention

The present invention relates to Coherent Diffractive Imaging with multiple, simultaneous, spatially distinct beams.

Discussion of Related Art

Coherent diffractive imaging (CDI), for example ptychography, is an emerging technique that enables wavelength- and diffraction-limited imaging without the need for refractive or reflective image forming optics. An object is illuminated and the resulting diffraction pattern is measured with a pixel detector. Then an image of the object is computationally reconstructed from the measured data using well known techniques such as those discussed in D. J. Batey, D. Claus, and J. M. Rodenburg, "Information multiplexing in ptychography,"Ultramicroscopy, vol. 138 C, pp. 13-21, December 2013 and P. Thibault and A. Menzel, "Reconstructing state mixtures from diffraction measurements," Nature, vol. 494, no. 7435, pp. 68-71, February 2013.

In conventional CDI, one single beam illuminates the object to be imaged. More advanced CDI techniques are limited to spatially non-distinct beams. The traditional limitation that the illuminating radiation be spatially non-distinct produces a few disadvantages: 1) The total scanned area in the case of spatially non-distinct beams is smaller than in our technique 2) Spatially non-distinct beams necessarily encounter the same object during a scan hindering image reconstruction.

A need remains in the art for apparatus and methods for performing CDI with two or more spatially distinct beams.

SUMMARY

It is an object of the present invention to provide apparatus and methods for performing CDI with two or more spatially distinct beams. The scatter pattern from these spatially distinct beams is collected on one or more pixel detectors in such a way that existing, multi-mode algorithms such as those discussed above can reconstruct the data into an image, possibly following a digital pre-processing step.

In the present invention, spatially distinct beams encounter different areas of the sample providing a scan area that is larger by the number of beams used and aiding the pre-existing reconstruction algorithms.

A method of performing Coherent Diffractive Imaging (CDI) of an object according to the present invention chooses and configures two or more spatially distinct, simultaneous beams in order to allow isolation of incoherent sums of beam diffraction. The object is illuminated with the beams, which produces a diffractive pattern. This diffractive pattern is then measured by a pixel detector, which generates diffractive data, and a processor reconstructs an image of the object from the diffractive data. If there is any significant inter-beam interference effects, a preprocessing step removes these before the image is reconstructed.

In some cases, there is no substantial inter-beam interference to remove, either because the beams naturally don't generate much interference (e.g., because they have different wavelengths or polarizations) or because most or all of the inter-beam interference falls on areas of the detector where it isn't detected. In the latter case, the beams are configured keeping in mind the pixel spacing of the detector.

In other cases, there is inter-beam interference, but it can be removed. This can happen if, for example, the beams are configured such that when a Fourier transform of the diffractive pattern is taken, the positive and negative autocorrelation peaks do not substantially overlap the central autocorrelation peak. Then the processor can take a Fourier transform of the diffractive pattern, remove the positive and negative autocorrelation peaks, and perform an inverse Fourier transform on the filtered central autocorrelation peak. Then image reconstruction proceeds as usual.

The CDI can be performed in a transmissive configuration (where the beams pass through the object) or in a reflective configuration (where the beams are reflected off of the object). If the beams are scanned over the object, ptychography imaging can be performed.

One especially useful embodiment generates the beam using high harmonic generation.

DETAILED DESCRIPTION OF THE INVENTION

Figure 1:
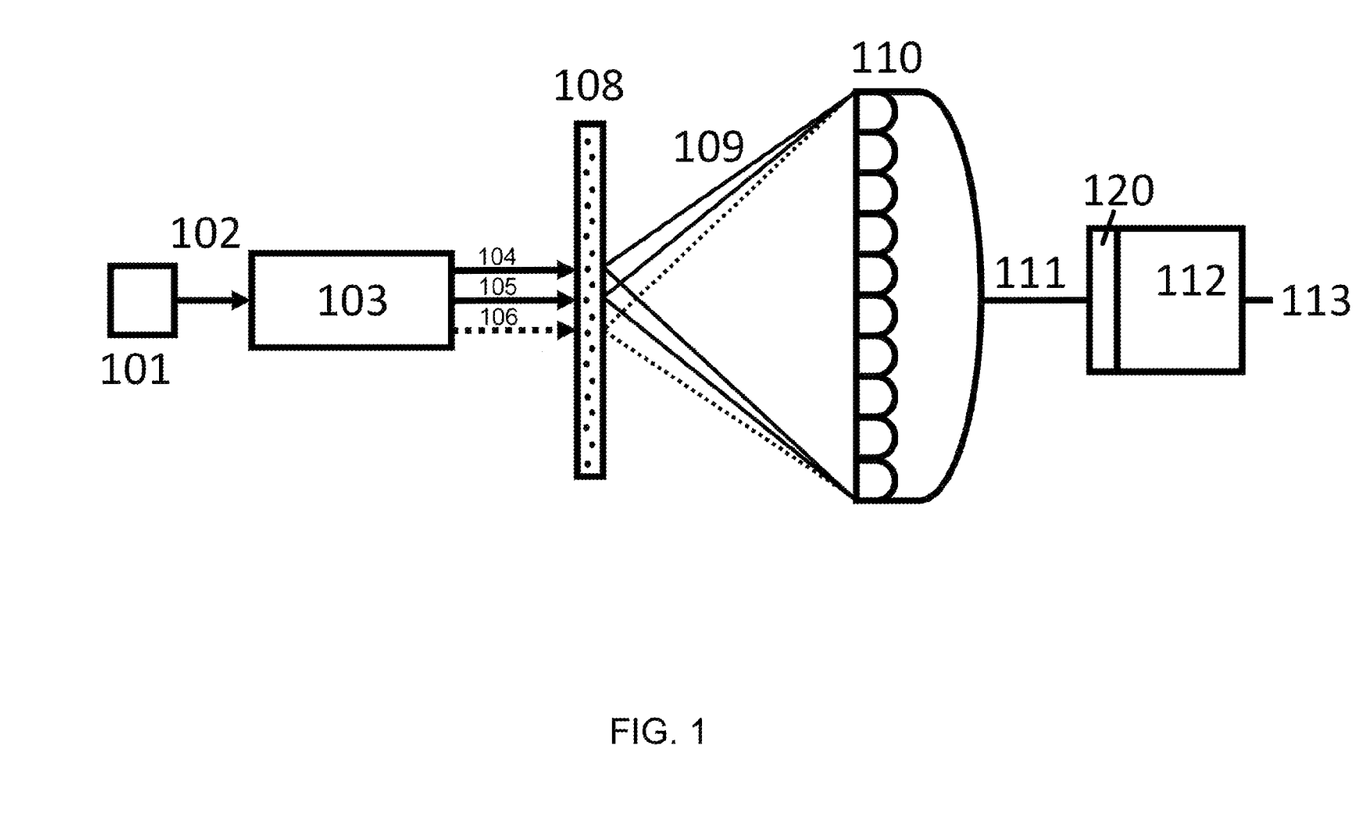
FIG. 1 is a schematic block diagram illustrating one configuration of multiple beam CDI apparatus according to the present invention.

FIG. 1 is a schematic block diagram that depicts coherent diffractive imaging (CDI) using multiple spatially distinct beams. An at least partially coherent source 101 creates a single beam 102 that enters a system 103 to convert it into multiple beams 104,105,106. Those skilled in the art will know that this can be done with a pair of diffraction gratings to spatially separate different wavelength radiation, with a birefringent crystal to separate different polarization radiation, with a pinhole array to generate spatially separate beams of similar properties, etc. Alternatively, an at least partially coherent source generates multiple beams: for example, random lasers. These beams 104-106 are incident on a sample 108. The diffracted waves 109 are measured simultaneously on a pixel detector 110. Simultaneous herein means detected simultaneously (within the acquisition time of the detector). Pixel herein means the smallest area on the detector in which we can make a distinct measurement. Data 111 from pixel detector 110 is provided to processor 112, which in some cases includes a preprocessor 120 (see FIG. 2). Processor 112 processes data 111 to produce reconstructed image 113. The embodiment shown in FIG. 1 is transmissive, but the technique is similar for reflective embodiments such as those taught in U.S. Pat. application Ser. No. 14/839,738, filed 28 Aug. 2015 and incorporated herein by reference.

The multiple spatially distinct beams 104-106 are chosen and configured to isolate incoherent sums of beam diffraction such that interference between the multiple beams (inter-beam interference) is not present in the data prior to computationally reconstructing the image. This can be accomplished in multiple ways. The beams may be configured such that they don't interfere in a substantial way with each other (see FIGS. 5 and 6). Or they may be selected and configured such that the beams do interfere, but in such a way that the interference is not detected (see FIGS. 3, 5, and 8) or in such a way that interference can be removed by preprocessor 120 before the image 113 is reconstructed (see FIGS. 2, 3, 5, and 7).

Figure 2:
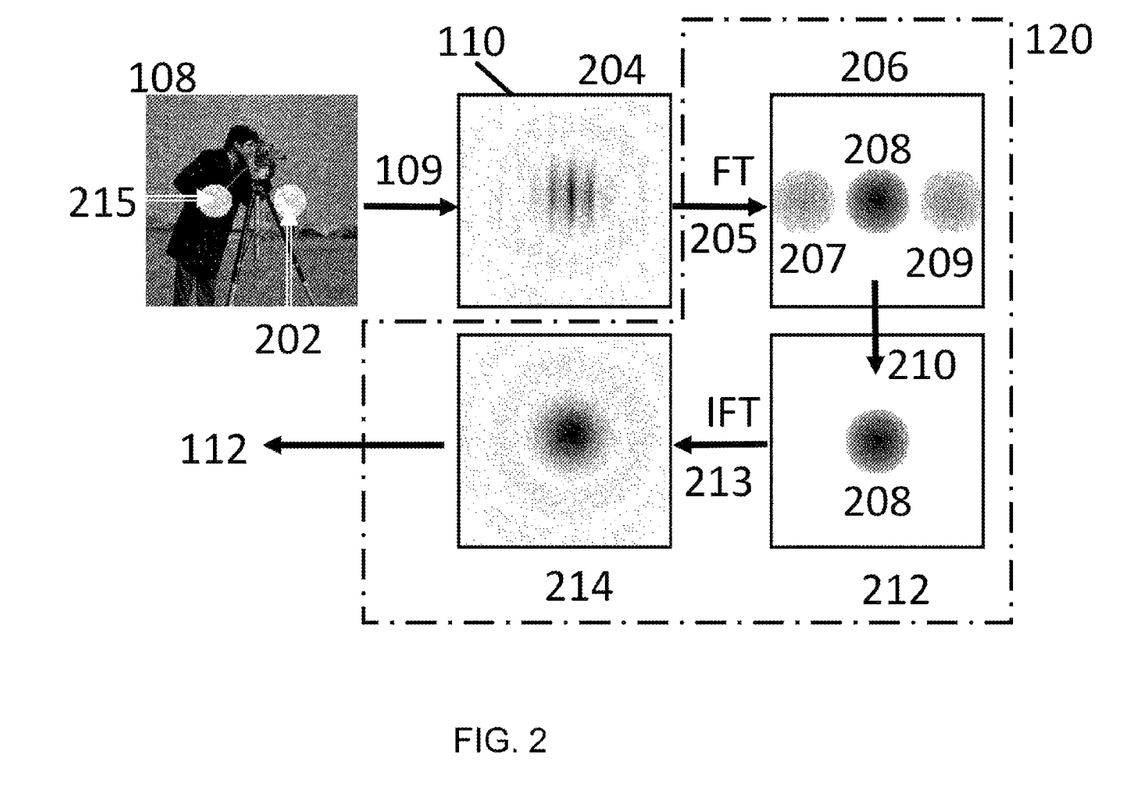
FIG. 2 is a flow chart depicting a process of treating (filtering collected diffraction patterns after detection to remove interference before image reconstruction) for an embodiment of the present invention.

FIG. 2 is a flow chart depicting a process of treating (filtering collected diffraction patterns after detection to remove interference before image reconstruction) for embodiments of the present invention where the spatially distinct beams interfere. FIG. 2 depicts the process of removing the interference between multiple beams digitally for the simplified case of two spatially distinct beams 202, 215 incident on object 108.

In summary, the process of autocorrelation filtering to convert a coherent sum of diffracted fields to an incoherent sum of diffracted fields is the following
1. Measure the intensity of the coherent sum of the fields
2. Take a Fourier transform of this intensity
3. Isolate the peak centered about the zero frequency
4. Take an inverse Fourier transform of this peak The exit surface wave 109 is propagated to detector 110 and the intensity of the interfering diffraction patterns 204 is recorded. Preprocessor 120 then removes the interference before processor 112 reconstructs the image. The two-dimensional Fourier transform intensity pattern is taken in step 205, yielding the autocorrelation of the exit surface wave 206. This autocorrelation has a peak centered at zero 208 and two peaks centered at the beam separation (positive and negative) 207,209. The peaks not centered at zero are removed 210, yielding only the central peak 208 in the filtered autocorrelation 212. The inverse Fourier transform of the filtered autocorrelation is taken in step 213. This results in a sum of the diffraction patterns from each beam without the interference terms, which we refer to as the incoherent sum 214. Incoherent sum 214 is then provided to processor 112 for image reconstruction.

Figure 3:
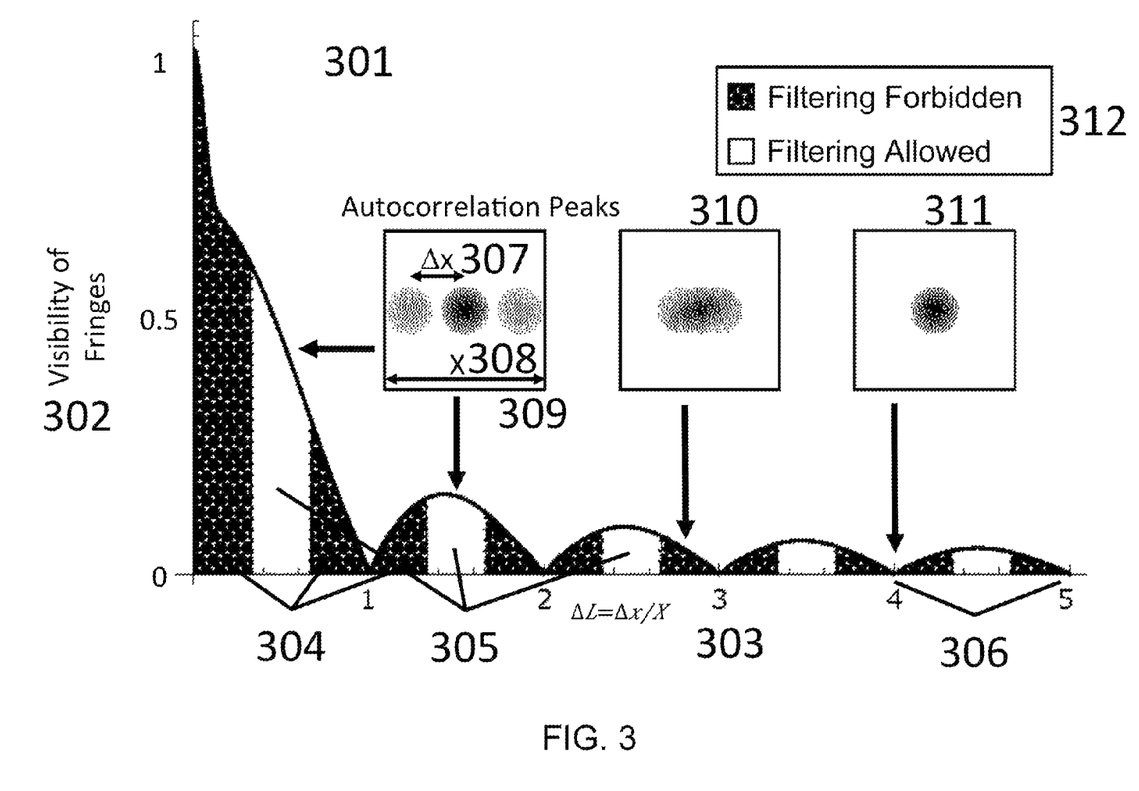
FIG. 3 is a plot illustrating how multiple beams are chosen and configured to allow CDI with spatially distinct beams in various embodiments of the present invention.

In order to digitally remove the interference terms, the positive and negative autocorrelation peaks 207, 209 must not overlap with the central autocorrelation peak 208. This condition is met whenever $$2 \leq \mathrm{mod}\left(\frac{\Delta x}{D}, \sigma\right) \leq \sigma - 2 \quad (1)$$

Where mod is the modulus function, $\Delta x$ is the center to center beam separation, D is the beam diameter, and $\sigma$ is the CDI oversampling of the beam: given by $$\sigma = \frac{\lambda z}{dxD}$$

where $\lambda$ is the wavelength of the beam, z is the distance from the sample to the detector, and dx is the detector pixel size. This inequality does not hold true unless the oversampling is at least 4, limiting the maximum extent of the beams for a given apparatus design. The modulus function in equation (1) allows for multiple regions of beam separation where the removal of the interference terms is permitted. This is illustrated in FIG. 3

FIG. 3 is a plot 301 of the visibility 302 of the interference fringes in a detected diffraction pattern as a function of the normalized beam separation 303. Overlays 309, 310, and 311 illustrate where filtering can be done, where it can't, and when it is not necessary.

The normalized beam separation 303 is the ratio of the physical beam separation 307 to the extent of the numerical grid of probe 308. The dark filled regions 304 of the plot show beam separations for which digital filtering is not possible. The filtering is not possible at these separations because the autocorrelation peaks overlap as shown in overlay box 310.

The light unfilled regions 305 of the plot show beam separations for which digital filtering is possible. The filtering is possible because the autocorrelation peaks are not overlapping as shown in overlay box 309. This process is shown in more detail in FIGS. 2 and 7. Once the collected diffraction patterns have been treated—converted from coherent sums to incoherent sums—they may be used with various conventional multiple mode ptychography algorithms to retrieve the phase of the exit surface wave and deconvolve the different modes.

Figure 8:
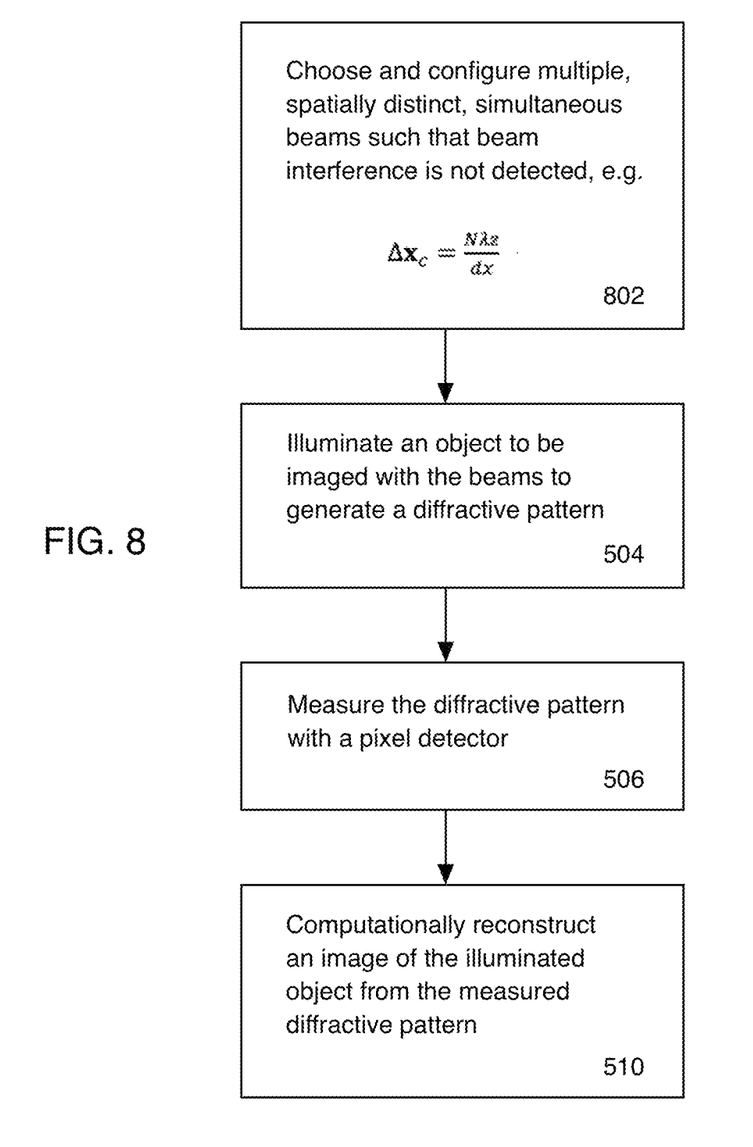
FIG. 8 is a flow diagram of the process of FIG. 5 where the chosen beam spacing and the detector pixel spacing are matched such that the interference is not recorded by the detector.

The points 306 in FIG. 3 for which the fringe visibility falls to zero are points where the detector naturally removes the interference terms through aliasing. The beam spacing has been matched to the pixel spacing of detector 110 to achieve this result. This process is shown in FIG. 8.

At these points 306, the period of the interference fringes is an integer multiple of the period of the detector 110 pixels for a preferably rectilinear and periodic detector. Thus the left and right autocorrelation peaks do not appear in the autocorrelation 311. Thus preprocessing is not necessary. The beam separation can be selected so that this condition is met:

$$\Delta x_c = \frac{N \lambda z}{dx} \quad (2)$$

Where $\Delta x_c$ is the beam separation for which the interference terms naturally vanish, and N is an integer. The recorded diffraction patterns are now an incoherent sum of the diffraction from each beam, the same as the case of beams that naturally do not interfere.

For ptychography CDI, the beams must be scanned across the sample and a diffraction pattern measured at each position. The diffraction patterns and scan positions are fed into a multi-mode reconstruction algorithm.

Figure 4:
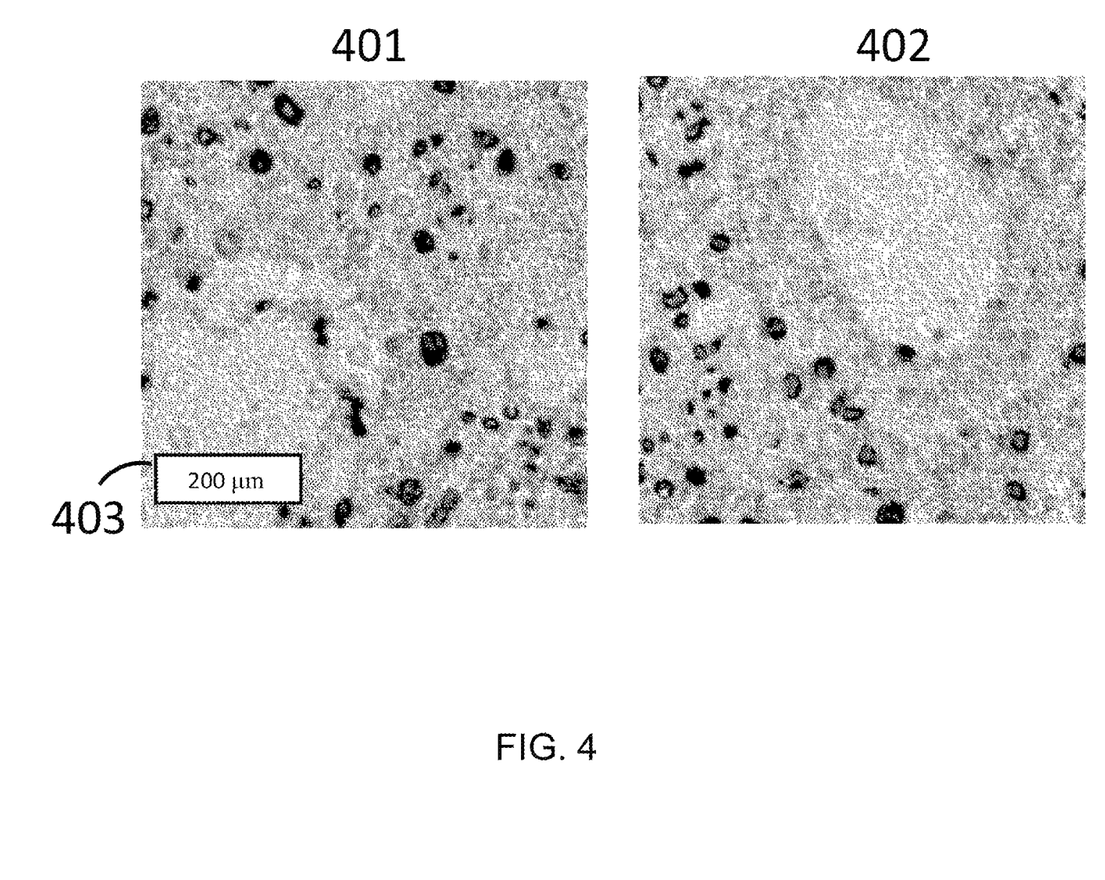
FIG. 4 illustrates images from a transmission mode optical ptychography microscope according to the present invention.

FIG. 4 shows images 401, 402 of a biological sample imaged using a transmission-mode, optical ptychography microscope with two beams. The scale bar 403 for both images is 200 µm. The wavelength of the two beams is 656 nm. The beam separation is 3.7 mm and the beam diameter is 0.4 mm for each beam. The distance to the detector is 2 cm and the detector pixel size is 5.2 µm. These parameters satisfy equation (1), meaning that we are able to isolate and remove the interference terms. The data are then fed into a multi-mode ptychography algorithm, resulting in reconstructed images of the sample.

Figure 5:
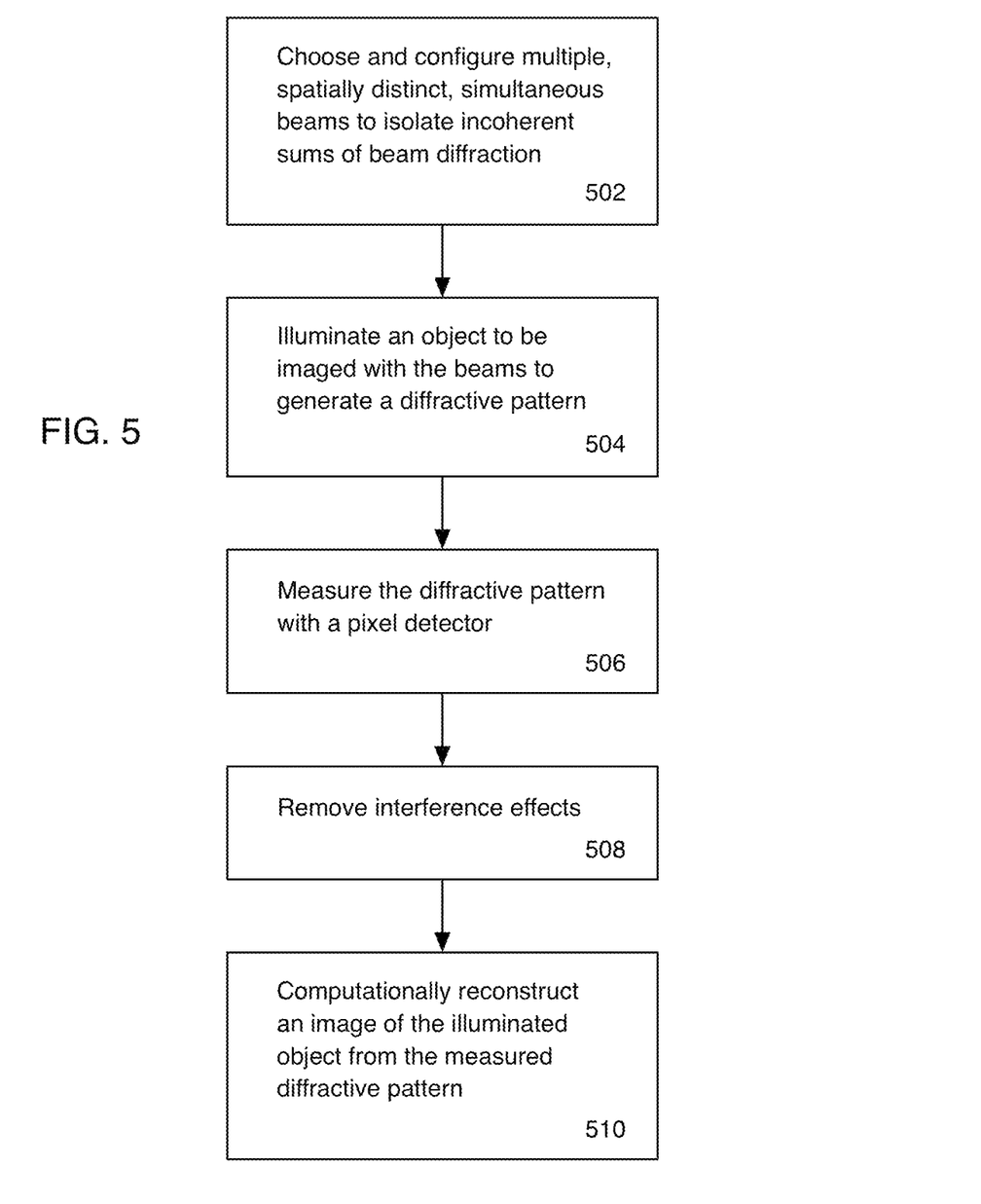
FIG. 5 is a flow diagram illustrating a general process of performing CDI with spatially distinct beams chosen and configured to isolate incoherent sums of beam diffraction.

FIG. 5 is a flow diagram illustrating a general process of performing CDI with spatially distinct beams chosen and configured to isolate incoherent sums of beam diffraction. In step 502, multiple, spatially distinct, simultaneous beams 104-106 are chosen and configured in such a manner that isolating incoherent sums of beam diffraction is possible. In step 504, Object 108 is illuminated with beams 104-106. In step 506, the resulting diffractive pattern 109 is measured with detector 110. In step 508, any interference effects are removed before step 510, wherein an image of the object is computationally constructed.

Figure 6:
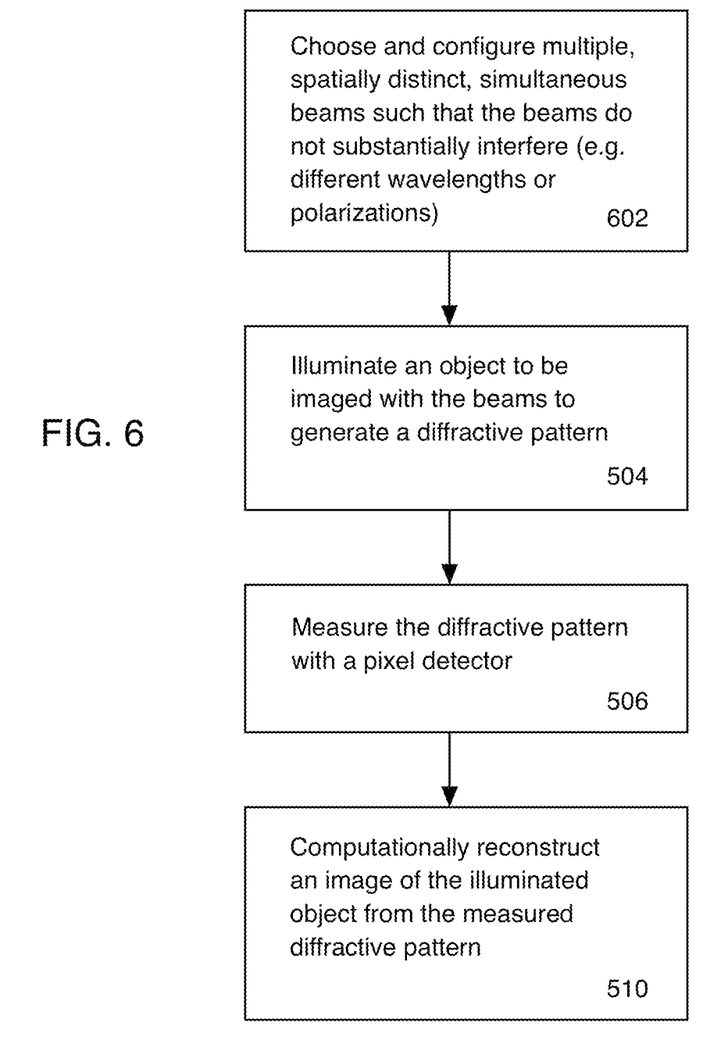
FIG. 6 is a flow diagram of the process of FIG. 5 where the chosen beams do not interfere.

FIG. 6 is a flow diagram of the process of FIG. 5 where the chosen beams 104-106 do not interfere. In step 602, beams 104-106 are chosen and configured so that they naturally do not interfere on the detector: for example, beams of different wavelengths or of orthogonal polarization states. Steps 504 and 506 operate as in FIG. 5. In this embodiment, step 508 is not necessary, since there are no substantial interference effects (different colors produce some interference, but not at frequencies that will be detected by detector 110). Step 510 reconstructs the image.

Figure 7:
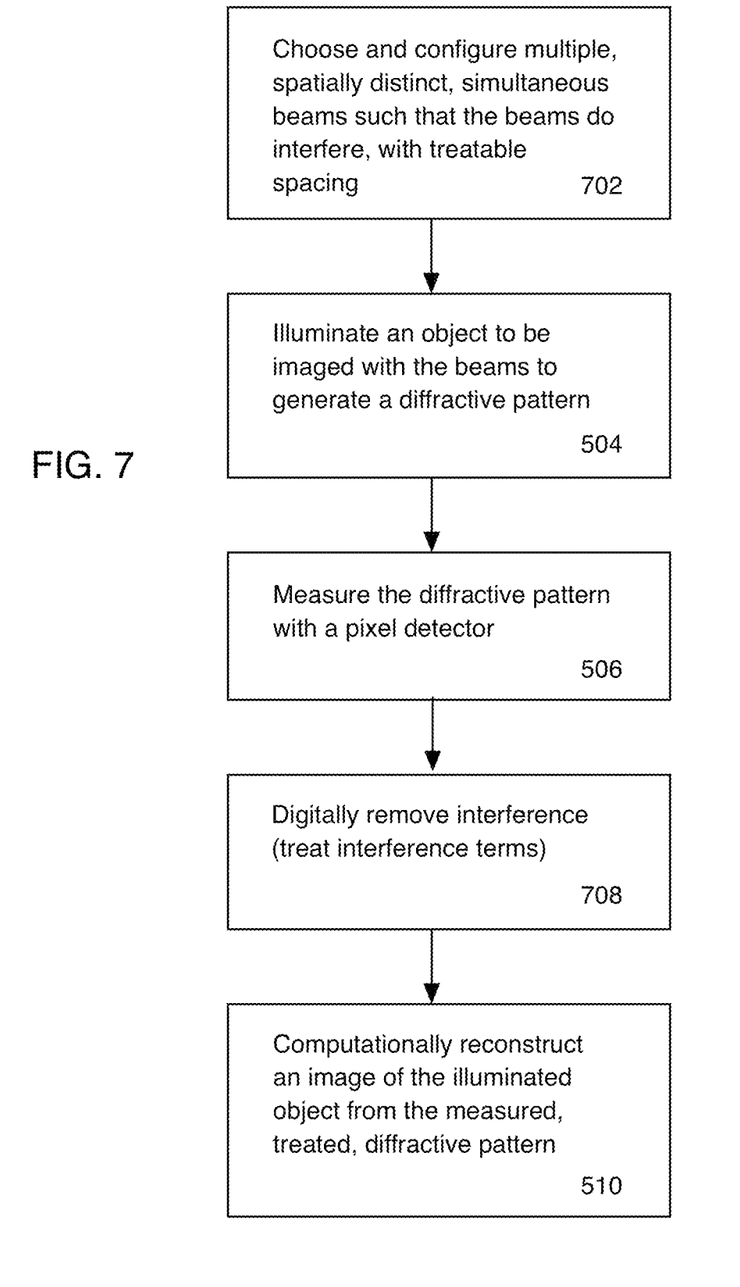
FIG. 7 is a flow diagram of the process of FIG. 5 where the chosen beams interfere such that the detected diffraction pattern is treatable to remove interference effects.

FIG. 7 is a flow diagram of the process of FIG. 5 where the chosen beams interfere such that the detected diffraction pattern is treatable to remove interference effects. In step 702, beams 104-106 are chosen and configured so that the beams will naturally interfere on the detector in such a way that preprocessor 120 can digitally remove the interference. The beam spacings that work are shown in FIG. 3. Steps 504 and 506 are as in FIG. 5. Step 708 removes the interference effects as shown in FIG. 2. Step 510 then reconstructs the image in the usual fashion.

FIG. 8 is a flow diagram of the process of FIG. 5 where the beam spacing and the detector pixel spacing are matched such that the interference is not recorded by the detector. Where there are two beams, this is accomplished as described in conjunction with equation (2). In this embodiment, step 508 is not necessary, since there are no detectable interference effects. Step 510 reconstructs the image.

While the embodiments of the present invention have been described hereinabove by way of example with particularity, those skilled in the art will appreciate various modifications, additions, and applications other than those specifically mentioned, which are within the scope of this invention. For example, the multiple beams 104-106 can be separated by further than their coherence length either spatially or temporally so that they no longer interfere. Also, the multiple beams 104-106 can be separated in two dimensions, instead of a single dimension. Additionally, more than two beams can be used, provided that the inter-beam interference can be avoided or properly treated for each beam pair.

What is claimed is:

1. The method of performing Coherent Diffractive Imaging of an object comprising the steps of:
   (a) choosing and configuring two spatially distinct, simultaneous beams in order to allow isolation of incoherent sums of beam diffraction;
   (b) illuminating the object with the beams and producing a diffractive pattern;
   (c) measuring the diffractive pattern with a pixel detector and producing diffractive data;
   (d) removing remaining substantial inter-beam interference effects from the diffractive data;
   (e) computationally reconstructing an image of the object from the diffractive data.

2. The method of claim 1 wherein step (a) includes the step of choosing and configuring beams that do not produce a substantial inter-beam interference pattern when illuminating the object.

3. The method of claim 2 wherein step (a) includes the step of choosing beams of differing wavelength.

4. The method of claim 2 wherein step (a) includes the step of choosing beams of differing polarization.

5. The method of claim 1 wherein step (a) includes the step of choosing and configuring beams based on a pixel spacing of the detector such that an inter-beam interference pattern is not substantially detected by the detector.

6. The method of claim 1 wherein step (a) includes the step of choosing and configuring beams such that, when a Fourier transform of the diffractive pattern is taken, the positive and negative autocorrelation peaks do not substantially overlap the central autocorrelation peak, and further including the step of taking a Fourier transform of the diffractive pattern;
   and wherein step (d) includes a filtering step that removes the positive and negative autocorrelation peaks and performs an inverse Fourier transform on the filtered central autocorrelation peak.

7. The method of claim 1 wherein step (b) includes the step of transmitting light through the object.

8. The method of claim 1 wherein step (b) includes the step of reflecting light off of the object.

9. The method of claim 1, further including the step of scanning the beams over the sample and performing steps (b)-(d) at various times.

10. The method of claim 1 wherein step (a) includes the step of performing high harmonic generation.

11. Apparatus for Coherent diffractive Imaging for imaging an object comprising:
   an illumination source for generating two at least partially coherent, spatially distinct, simultaneous beams, the illumination source configured to illuminate the object, the illumination source configured to allow isolation of incoherent sums of beam diffraction;
   a pixel detector configured to detect a diffraction pattern resulting from the beams illumination of the object;
   a processor configured to remove substantial inter-beam interference from the detected diffraction pattern, the processor further configured to computationally reconstruct an image of the object from the detected diffraction pattern.

12. The apparatus of claim 11 further configured to scan the beams over the object in order to perform ptychography imaging.

13. The apparatus of claim 11 wherein the illumination source is configured to generate beams which do not generate inter-beam interference.

14. The apparatus of claim 13 wherein the illumination source is configured to generate beams having differing wavelengths.

15. The apparatus of claim 13 wherein the illumination source is configured to generate beams having differing polarizations.

16. The apparatus of claim 11 wherein the illumination source and the pixel detector are configured such that any substantial inter-beam interference is located such that it is not detected by the detector.

17. The apparatus of claim 11, wherein the illumination source configures the beams such that when a Fourier transform of the diffractive pattern is taken, the positive and negative autocorrelation peaks do not substantially overlap the central autocorrelation peak; and wherein the processor is further configured to perform a Fourier transform, filter out positive and negative autocorrelation peaks, and perform an inverse Fourier transform.

18. The apparatus of claim 11 configured in a transmissive arrangement.

19. The apparatus of claim 11 configured in a reflective arrangement.

20. The apparatus of claim 11 wherein the illumination source includes apparatus for high harmonic generation.

* * * * *